United States Patent Office 3,491,142
Patented Jan. 20, 1970

3,491,142
CARBOXY-DI-P-XYLYLENE AND DERIVATIVES
THEREOF
Ying L. Yeh, Highland Park, and Anthony M. Fazzari,
New Brunswick, N.J., assignors to Union Carbide Corporation, a corporation of New York
No Drawing. Filed Dec. 30, 1964, Ser. No. 422,406
Int. Cl. C07c 69/76
U.S. Cl. 260—469                    8 Claims

ABSTRACT OF THE DISCLOSURE

The lithium substitution of brominated di-p-xylylene can be controlled by regulating the temperature of substitution. At temperatures between 60° C. to 90° C. all the bromine substituents are replaced by reaction with a lithium alkyl while at temperatures between 0° C. and 60° C. at least one bromine substituent is not replaced.

---

This invention relates to the preparation of nuclear substituted di-p-xylylenes containing two or more nuclear substituents at least one of which is a carboxylic acid moiety or a derivative thereof including di-p-xylylene dicarboxylic acid.

Di-p-xylylene monocarboxylic acid has been prepared by Cram and Allinger, Jr., Am. Chem. Soc. 77, 6289 (1955) from di-p-xylylene represented by the formula:

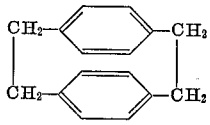

by low temperature Freidel-Crafts acetylation thereof with acetyl chloride and anhydrous aluminum chloride. The acetylated product can then be converted to di-p-xylylene monocarboxylic acid by oxidation with a hypohalite. However, Cram and Allinger, supra, found that the acetyl group on one ring of the cyclic di-p-xylylene thoroughly protected both rings thereof from further substitution. Further nucleophilic substitution on di-p-xylylene in addition to one carboxylic acid or carboxy derived group has not been provided in the art.

The above finding that the acetyl group on one ring of the cyclic di-p-xylylene thoroughly protected both rings thereof from further substitution might be expected from the fact that basic reactions normally attributed to aromatic compounds are not particularly applicable to the di-p-xylylene because of the close proximity of the aromatic nuclei with resultant electronic interaction between π-electrons of the two aromatic rings. In addition, the aromatic rings are distorted from their normal planar configuration giving rise to a strained and sterically hindered molecule.

Thus, the strained and sterically hindered nature of the di-p-xylylene has heretofore limited the degree of nuclear substitution obtainable in the carboxylic acid or carboxy derived substituents to mono-substitution. It is, therefore, essential to develop new methods to secure such poly-substituted compounds which are required for the preparation of useful polymers therefrom.

Accordingly, it is an object of the present invention to provide as novel composition di-p-xylylenes having at least one substituent in each ring, at least one of which is carboxylic acid or carboxy derived.

According to the present invention, it has been found that poly-substituted di-p-xylylenes characterized by the structural formula

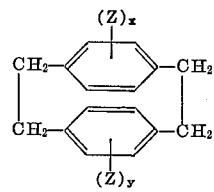

(I)

where Z is a member selected from the group consisting of COR and bromine and R is a member selected from the group consisting of hydroxy, halogen, alkyl, aryl, amino, alkylamino, alkoxy and acetoxy and x and y are integers having a value of from 1 to 3 inclusive with the proviso that at least one Z is COR, can be prepared by the reaction comprising contacting a polybromo di-p-xylylene represented by the formula:

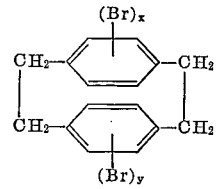

(II)

wherein x and y have the values indicated above, with a lithium alkyl in the presence of an inert organic liquid solvent for the polybromo di-p-xylylene under anhydrous conditions and at a temperature between about 0° C. and 90° C., the lithium alkyl being used in amounts sufficient to replace at least one bromine from thereon with the corresponding number of lithium atoms. Thereafter the lithium substituted di-p-xylylene is contacted with free carbon dioxide and acid to ultimately replace each substituted lithium atom with a carboxylic acid group and form a di-p-xylylene having one or more substituents on each ring, at least one of which is carboxylic acid and the remaining substituents, if any, are bromine to give novel compounds having the structure:

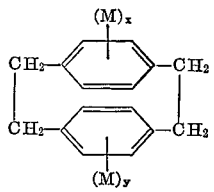

(III)

where M is a member selected from the group consisting of carboxylic acid and/or bromine and x and y have the previously indicated values, with the proviso that at least one M is a carboxylic acid group. Compounds of the above structural formula can be further processed to form other novel compounds of the present invention by forming functional derivatives of the carboxylic acid groups. For example, the carboxylic acid groups can be converted to the corresponding acid chlorides, esters, amides, alcohols and the like thereby forming the structure shown in Formula I. And R, when an alkyl, can have 1 to 8 carbon atoms or more. For the preparation of alkyl esters, the di-p-xylylene carboxylic acids need only be refluxed with an alkyl alcohol to form the alkyl esters having COR groups on the aromatic nucleus.

The brominated starting material can be conveniently prepared by contacting the cyclic dimer, di-p-xylylene, with free bromine in the presence of a Friedel-Crafts catalyst, such as the halides of boron, aluminum, zinc, iron, titanium, and tin and preferably the bromides of such metals. If desired, and as a convenient technique, it is possible to prepare the catalyst in situ during the reaction by the use of the free metal. For example, the use of catalytic quantities of iron powder, in a mixture of the di-p-xylylene and the free bromine, will react to form ferric bromide which serves as the catalyst in the reaction. Equivalent results can be secured however, by using ferric bromide of other Friedel-Crafts catalyst initially.

The reaction is most conveniently conducted in an inert organic diluent such as carbon tetrachloride, methylene chloride as well as inert solvents which are thereselves halogenated or which can be readily halogenated in the reaction but which are inert to the di-p-xylylene and do not hinder or prevent the reaction. The use of bromine dissolved in the solvent selected for the reaction makes it easy to control the reaction and facilitates accurate determination of addition rates of the bromine.

While the reaction readily proceeds without need for additional heart, it is often desirable to hasten the reaction by mild heating to as high as 80° C., although it is possible to conduct the reaction at temperatures as low as 0° C. if desired. After apparent reaction is terminated as evidenced by vapor phase chromatographic analysis of samples taken periodically during the addition of bromine to the reaction mixture or simply noting the acceptance of the stoichiometric proportions of bromine by the reaction system, the brominated products can be recovered, after filtering off the catalyst, by concentrating the reaction mass by distillation or other similar means and thereafter causing the crystallization or precipitation of the brominated di-p-xylylene by cooling of the reaction medium. The brominated product can be readily recovered by filtration and purified by sublimation.

By careful control of the amount of bromine added, the degree of bromination can be regulated to give brominated products in relatively pure form, and substantially free of large amounts of the other brominated products. For example, a mixture of mono bromo and dibromo di-p-xylylene can readily be separated due to the divergence of melting points, i.e., mono bromo di-p-xylylene having a melting point of 132°–134° C. and dibromo di-p-xylylene having a melting point of 245°–246° C., by such convenient means as fractional distillation.

In the process of the present invention, the brominated di-p-xylylene is contacted with the lithium alkyl in amounts basically corresponding to at least stoichiometric amounts, i.e., about one mole of lithium alkyl per mole atom of bromine on the di-p-xylylene. Preferably an excess of the lithium alkyl is employed, generally about 100 percent in excess of stoichimetric, although greater or lesser amounts can be employed, if desired.

The particular lithium alkyl employed herein is not critical inasmuch as the lithium atom replaces the bromine atom or atoms on the di-p-xylylene, resulting in the formation of an alkyl bromide which is easily removed from the system if desired or can otherwise remain in the reaction mass as an inert diluent. Because of ease of obtaining the lithium lower alkyls and their relative costs, it is preferred to employ the materials having up to about 10 carbon atoms in the alkyl moiety, such as methyl lithium, ethyl lithium, propyl lithium, n-butyl lithium, hexyl lithium and the like.

These compounds can be employed with or without organic diluents. The commercilly available lithium alkyls, generally marketed in aliphatic solvents such as pentane and hexane can be used in such form without need to remove the solvent.

It is desirable that the entire reaction of the brominated di-p-xylylene with the lithium alkyl be conducted in an inert organic solvent for the reactants and products, i.e., an organic liquid in which the brominated di-p-xylylene is completely soluble at the reaction temperatures and which is inert and unreactive toward it and the products prepared. It is not necessary however, that the brominated di-p-xylylene be soluble in the solvent media at room temperatures. Such solvents as aromatic hydrocarbons as, for example, benzene, toluene, naphthalene, and the like, cyclic and acylic aliphatic ethers and similar solvents such as tetrahydrofuran, dioxane, aliphatic ethers such as diethyl ether, ethyl propyl ether, methyl butyl ether, allyl ethyl ether and the like are well suited for use as the inert solvent medium for this reaction. Preferably, the normal boiling points of these solvents are below 90° C. so that reflux conditions con conveniently be maintained, for example at atmospheric pressure. However, accurate temperature control can be maintained by other techniques convenient to those skilled in the art.

While the reaction is basically conducted without need for a catalyst, it is possible to employ a catalyst if desired. Copper powder serves exceptionally well for this reaction.

There are no critical pressure limitations imposed on the reaction, for it will readily proceed at subatmospheric, atmospheric or superatmospheric pressures. However, inasmuch as the lithium alkyls readily hydrolyze in the presence of even atmospheric moisture, care must be exercised to provide for anhydrous solvents and that the surrounding atmosphere is inert and dry. Preferably an atmosphere of dry nitrogen is employed, although any other suitable dry gas which is inert under the reaction conditions can be employed. It has thus been found desirable and convenient to use atmospheric or slightly above atmospheric pressures with dry solvents having boiling points below 90° C. Thus by the term "under anhydrous conditions" as employed herein, it is meant to employ solvents substantially free of moisture content and to employ a dry inert ambient atmosphere for the reaction.

The reaction of the lithium alkyl with the brominated di-p-xylylenes for the preparation of a lithium intermediate can be suitably conducted in a temperature range of about 0° C. to 90° C. for replacement of at least one bromine substituent thereon with the corresponding number of lithium atoms. However, the above lithium substitution reaction is preferably conducted in a temperature range of from about 60° C. to 90° C. for ultimate preparation of di-p-xylylene polycarboxylic acids or from 0° C. to about 60° C. for ultimate preparation of bromo di-p-xylylene carboxylic acids. Thus, for example, where dibromo di-p-xylylene is contacted with a lithium alkyl at temperatures between 60° C. and 90° C., both bromine substituents are replaced with the corresponding numbers of lithium atoms forming di-lithio di-p-xylylene which upon carbonation and acidification is converted to di-p-xylylene di-carboxylic acid. However, where di-bromo di-p-xylylene is contacted with a lithium alkyl at temperatures between 0° C. and 60° C. one bromine substituent thereon is replaced with a lithium atom forming the corresponding lithium intermediate which converts to monobromo di-p-xylylene monocarboxylic acid upon the above steps of carbonation and acidification. The choice of temperature range in the formation of the lithium intermediates from the polybromo di-p-xylylene is thus controlling since at temperatures lower than 60° C., the reaction will generally not go to completion leaving bromine on the di-p-xylylene and thus resulting in a bromo-carboxylic acid-di-p-xylylene, while at temperatures lower than 0° C. the reaction proceeds sluggishly at uneconomical rates. At temperatures much higher than about 90° C., side reactions begin to interfere to give lower yields of the desired lithium di-p-xylylene and by-product formation complicating the recovery of the pure material.

The carboxylation of the lithium intermediate compounds by the steps of carbonation and acidification is not critical as to the conditions used. For example the carboxylation can proceed in the reaction mixture in which the intermediate is formed or the lithium intermediate compound can be isolated and subjected to carboxylation in the presence of an inert solvent if desired. The reaction readily proceeds at room temperature without need for catalyst or heat. However, if desired, the reaction can be conducted at elevated temperatures or at temperatures lower than room temperature.

In the carbonation of the lithium intermediate compounds, carbon dioxide is preferably employed in the form of dry ice. However, carbon dioxide can also be employed as a gas dissolved in a suitable solvent therefor which is readily miscible with the selected solvent for the lithium alkyl reaction or the carbon dioxide may be directly introduced to the selected solvent. Where Dry Ice is employed, the reaction temperature will tend to be considerably lower than where the carbon dioxide gas is used since the sublimation temperature of Dry Ice is −78.5° C.; however, the carbonation reaction will be effective in either event.

The above carbonation reaction proceeds stoichiometrically with one mole of carbon dioxide combining with one mole of lithium to form the lithium salts of carboxylic acid with the carbon atom becoming attached to the ring of the di-p-xylylene in place of the lithium atom. The solution is then acidified with any of the common inorganic or organic acids, including mineral acids, for example, hydrochloric acid to liberate the free acid by replacing the substituted lithium atom with hydrogen atoms in a 1 to 1 molar ratio thereby converting the lithium intermediate to the corresponding di-p-xylylene carboxylic acid. To assure substantially complete reaction, excess amounts of carbon dioxide and acid are preferably employed.

The bromo di-p-xylylene carboxylic acid or the di-p-xylylene carboxylic acid, thus formed, precipitates as a solid at temperatures up to the respective melting points thereof, temperatures considerably above room temperature. The precipitate is then collected and purified by conventional means such as by filtration, washing and evaporation of the wash liquid. Thus, successive washing of the precipitate can be done, for example, with water and ether.

Compounds prepared by this technique include mono bromo di-p-xylylene mono carboxylic acid characterized by the structural formula:

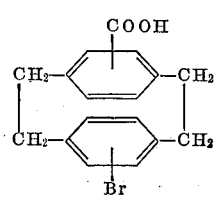

A further compound produced by the described technique is di-p-xylylene di-carboxylic acid having the formula:

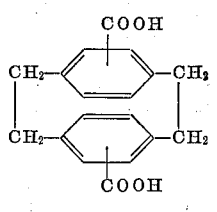

Derivatives of the thus prepared carboxylic acids can be prepared as indicated. Monobromo di-p-xylylene mono carboxylic acid can be esterified, for example, by refluxing the acid in methyl alcohol, using concentrated sulfuric acid as a catalyst. The acid reacts with the alcohol in a 1 to 1 molar ratio but as excess of alcohol is preferably used to provide substantially complete esterification. The methyl ester of monobromo di-p-xylylene monocarboxylic acid is characterized by the formula:

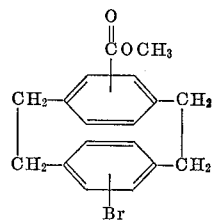

The di-p-xylylene polycarboxylic acids have been found generally to resist sublimation and thus pyrolytic polymerization when heated and to decompose, instead, at about 310° C. This occurs due to the tendency of carboxylic acid groups to effect hydrogen bonding with one another and effect chain linkage where di-p-xylylenes have at least two carboxylic acid substituents thereon.

However, di-p-xylylene polycarboxylic acids can be converted to the carboxy derivatives thereof which can be sublimed and polymerized and di-p-xylylene monocarboxylic acids can also be pyrolytically polymerized. Thus polysubstituted di-p-xylylenes having one carboxylic acid substituent or none effectively pyrolyze and can be represented by the formula

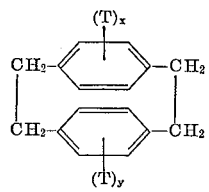

where T is a member selected from the group consisting of bromine and COR and R, x and y have the values previously indicated, with the proviso that only one R be a hydroxy radical.

The above compositions can be readily pyrolyzed at temperatures of 450° C. to 700° C. to cleave the dimer into two reactive diradicals:

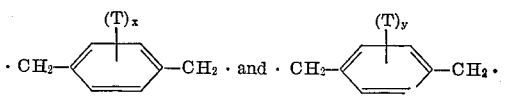

where T, x and y have the values indicated and T can occupy any of the available positions on the aromatic nuclei. It is preferred that temperatures of about 550° C. to 600° C. be used for securing essentially quantitative yields of the reactive diradicals. Operation below this temperature range, for example, 450° C. to 550° C. serves only to increase the time of reaction and lessen the yield of polymer secured. At temperatures above 700° C. cleavage of the substituent group can occur resulting in cross linking or highly branched polymers.

The reactive diradicals thus formed are quite stable in the gaseous state at temperatures above 300° C., but when cooled to their condensation temperature, generally below 200° C., polymerization occurs.

Where the reactive diradicals are the same as where, for example, the dimethyl ester of di-p-xylylene di-carboxylic acid is pyrolyzed and condensed, a homopolymer is obtained. The homopolymer can be represented by the repeating unit:

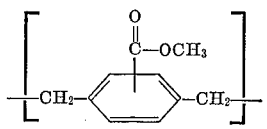

Where the reactive diradicals are different, or where mono bromo di-p-xylylene monocarboxylic acid is pyrolyzed and condensed a random copolymer is obtained having the repeating units:

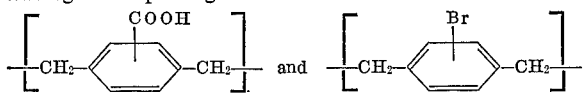

The products thus formed whether homopolymers or copolymers are tough, high melting, solvent resistant polymers.

Where different diradicals having different vapor pressures and condensation temperatures are present in the pyrolyzed mixture, homopolymers can result when a condensation and polymerization temperature is selected that is below the condensation temperature of but one of the diradicals. Thus one diradical can be condensed and polymerized in one polymerization zone and another can be passed through the zone in vaporous form to be condensed and polymerized in a subsequent polymerization zone. Of course, copolymers result when thec ondensation temperature employed is below the condensation temperature of at least two diradicals.

The following examples are illustrative of this invention but are not intended to serve as any limitation or restriction thereof. All percentages and parts are by weight.

EXAMPLE I

Preparation of mono-bromo di-p-xylylene monocarboxylic acid.—A mixture consisting of 5 grams of di-p-xylylene, 0.1 gram of iron powder and 400 ml. of carbon tetrachloride was placed in a 500 ml., 3 neck flask, equipped with a reflux condenser, stirrer and addition funnel. A solution of 10 grams of bromine in 50 ml. of carbon tetrachloride was added dropwise from this addition funnel to the stirred suspension over a 30 minute period. The reaction mixture was stirred at 10° C. to 20° C. for 12 hours. The catalyst was filtered off, and the solution concentrated to 30 ml. by distillation. Upon cooling, di-bromo-di-p-xylylene crystallized from solution. The material was separated by filtration, and purified by sublimation. A total of 3.3 grams (equivalent to 37 percent yield was obtained). The material had a melting point of 245° C. to 246° C. The material analyzed for 43.4 percent bromine, and compared with the theoretical value of 43.7 percent.

A 20 gram quantity of di-bromo di-p-xylylene prepared as above and 1 liter of dry benzene were placed in a dry two-necked flask equipped with a condenser (protected from moisture with a drying tube), a magnetic stirrer and a dry nitrogen gas inlet. The resultant mixture was stirred and heated until complete solution was obtained. The solution was brought to room temperature, about 20° C. to −30° C. and then about 5 grams of copper powder was added, followed by 75 ml. of n-butyl lithium solution having 14 to 15% n-butyl lithium in pentane. This mixture was stirred for 30 minutes and then quickly poured into a beaker containing an excess of powdered Dry-Ice with further stirring. After allowing the mixture to warm to room temperature, the mixture was extracted repeatedly with water. The water extracts were combined, filtered and acidified with hydrochloric acid and monobromo di-p-xylylene mono carboxylic acid precipitated out as a solid. The solid was collected by filtration and washed successively with water and ether. The yield of the acid was 50% of theoretical and its melting point was found to be 285 to 287° C. a microanalysis on bromine confirmed that only one bromine on the dimer had been replaced.

The acid, a white crystalline solid, can be represented by the formula:

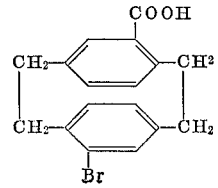

The above compound was additionally identified by the preparation and analysis of the methyl ester thereof as discussed in Example II.

EXAMPLE II

Methyl ester of monobromo di-p-xylylene mono carboxylic acid.—The acid product of Example I was refluxed with excess dry methanol in the presence of a few drops of concentrated sulfuric acid. After one hour, the mixture was concentrated to dryness under reduced pressure. The whole process was repeated until all the acid became soluble in boiling methanol. The crude ester obtained after concentration was washed with sodium bicarbonate, water and was dried. The yield of the product was essentially quantitative. A pure sample was obtained by sublimation followed by recrystallization from methanol. The sample was 95.0 percent pure as established by vapor phase chromatography, and melted at 151 to 153° C. Infrared spectra analysis of the compound showed one peak in the range of 5.70 to 5.83 microns indicating the presence of an ester group, while analysis for bromine content on the above compound found 21.09% bromine as compared with the theoretical value of 23.19%. The compound was thus determined to be the methyl ester of mono-bromo di-p-xylylene mono carboxylic acid which is also called mono carbomethoxy mono bromo di-p-xylylene.

EXAMPLE III

Di-p-xylylene di carboxylic acid.—The procedure was the same as that of Example I except that after the n-butyl lithium solution was added to the dibromo di-p-xylylene solution, the resultant mixture was heated to reflux (about 80° C.) under nitrogen atmosphere for one hour before being contacted with the powdered Dry Ice. The acid product was di-p-xylylene dicarboxylic acid obtained in a 95 percent yield. The acid did not melt up to 310° C. and did not sublime up to this temperature at reduced pressure. Analysis indicated no bromine present. The acid, a white crystalline solid, can be represented by the formula:

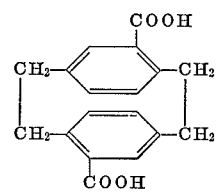

The above compound was additionally identified by the preparation and analysis of the dimethyl ester thereof as discussed in Example IV.

EXAMPLE IV

Dimethyl ester of di-p-xylylene dicarboxylic acid.—The diacid of Example III was refluxed with dry methanol in the presence of a few drops of concentrated sulfuric acid and the process was otherwise conducted in the same manner as that of Example II. A 98.7 percent pure sample of the dimethyl ester was obtained with a melting point of about 199 to 201° C. Analysis indicated no bromine was present.

Analysis.—Calculated for $C_{20}H_{20}O_4$: C, 74.07; H, 6.17. Found: C, 73.79; H, 6.25. The identity of the above dimethyl ester, i.e. di carbomethoxy di-p-xylylene was thus established.

What is claimed is:

1. Process for the preparation of poly substituted di-p-xylylenes having the general formula:

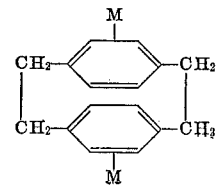

where M is a member selected from the group consisting of carboxylic acid and bromine, with the proviso that at least one M is a carboxylic acid group, which comprises contacting a poly bromo di-p-xylene having the structural formula:

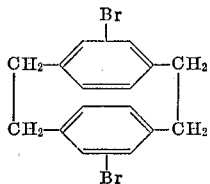

with a lithium alkyl in the presence of an inert organic liquid solvent under anhydrous conditions and a temperature between about 0° C. and 90° C., the lithium alkyl being used in amounts sufficient to replace at least one bromine substituent with the corresponding number of lithium atoms, with the proviso that when said temperature is between 0° C. and 60° C. at least one bromine atom remains as a ring substituent and when the temperature is between 60° C. and 90° C., both the bromine substituents are replaced with the corresponding number of lithium atoms and thereafter contacting the lithium substituted di-p-xylylene with free carbon dioxide and hydrogen ions to replace each substituted lithium with a carboxylic acid group and form the corresponding di-p-xylylene carboxylic acid.

2. Process according to claim 1 wherein dibromo di-p-xylylene is contacted with a lithium alkyl at a temperature between 60° C. and 90° C. to replace the two bromine substituents thereon with the corresponding number of lithium atoms.

3. Process according to claim 1 where dibromo di-p-xylylene is contacted with a lithium alkyl at a temperature between 0° C. and 60 °C. to replace one bromine substituent thereon with one lithium atom.

4. Process for the preparation of alkyl esters of di-p-xylylene carboxylic acids which comprises forming di-p-xylylene carboxylic acids according to the process of claim 1 and thereafter refluxing the di-p-xylylene carboxylic acids with an alkyl alcohol to form the alkyl ester substituents having 1 to 8 carbon atoms.

5. Process for the preparation of poly substituted di-p-xylylenes having the general formula:

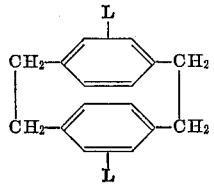

where L is a member selected from the group consisting of lithium and bromine, with the proviso that at least one L is lithium which comprises contacting a poly bromo-di-p-xylylene having the structural formula:

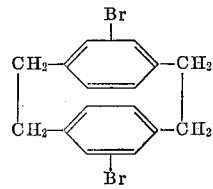

with a lithium alkyl in the presence of an inert organic liquid solvent under anhydrous conditions and at a temperature between about 0° C. and 90° C., the lithium alkyl being used in amounts sufficient to replace at least one bromine substituent with the corresponding number of lithium atoms, with the proviso that when said temperature is between 0° C. and 60° C. at least one bromine atom remains as a ring substituent and when the temperature is between 60° C. and 90° C. both the bromine substituents are replaced with the corresponding number of lithium atoms.

6. Process according to claim 5 wherein dibromo di-p-xylylene is contacted with a lithium alkyl at a temperature between 60° C. and 90° C. to replace the two bromine substituents thereon with the corresponding number of lithium atoms.

7. Process according to claim 5 where dibromo di-p-xylylene is contacted with a lithium alkyl at a temperature between 0° C. and 60° C. to replace one bromine substituent thereon with one lithium atom.

8. Mono-bromo-di-p-xylylene monocarboxylic acid characterized by the formula:

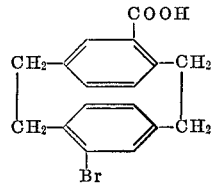

References Cited

UNITED STATES PATENTS 3,221,068  11/1965  Gorham _____ 260—649
3,288,728  11/1966  Gorham _____ 260—649

OTHER REFERENCES

Jones et al., Organic Reactions, vol. 6, pp. 345–346, 1951.

Migridichian, Organic Synthesis, vol. 1, 1957, p. 311.

LORRAINE A. WEINBERGER, Primary Examiner

E. JANE SKELLY, Assistant Examiner

U.S. Cl. X.R.

260—2, 475, 515, 544, 546, 558, 591, 592, 649, 665